Oct. 6, 1953  E. H. AUSTIN  2,654,876
ROAD ACTUATED SAFETY SIGNAL FOR VEHICLES
Filed Aug. 11, 1950  2 Sheets-Sheet 1
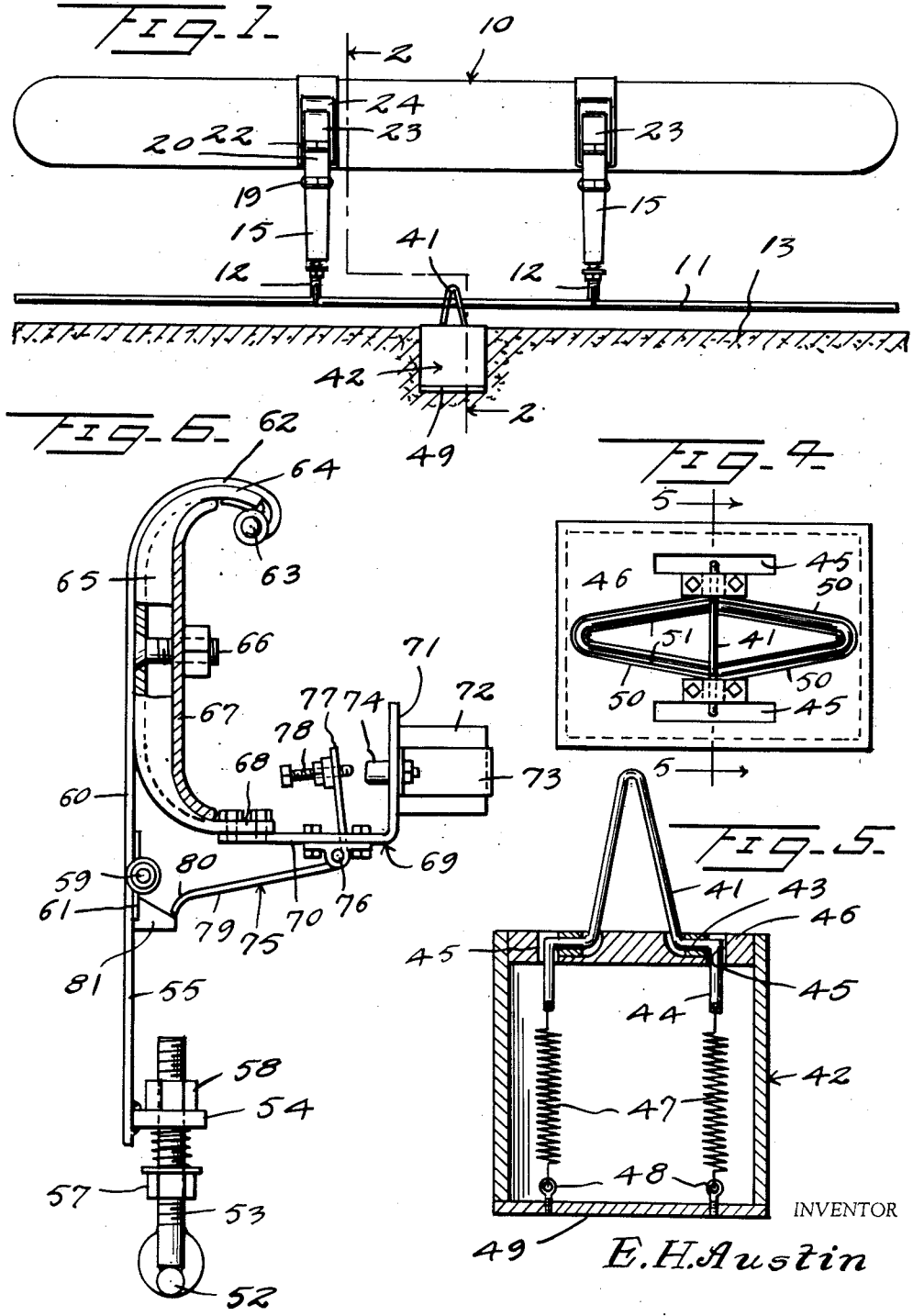
INVENTOR
E. H. Austin
BY
Kimmel & Crowell
ATTORNEYS Oct. 6, 1953 E. H. AUSTIN 2,654,876
ROAD ACTUATED SAFETY SIGNAL FOR VEHICLES
Filed Aug. 11, 1950 2 Sheets-Sheet 2
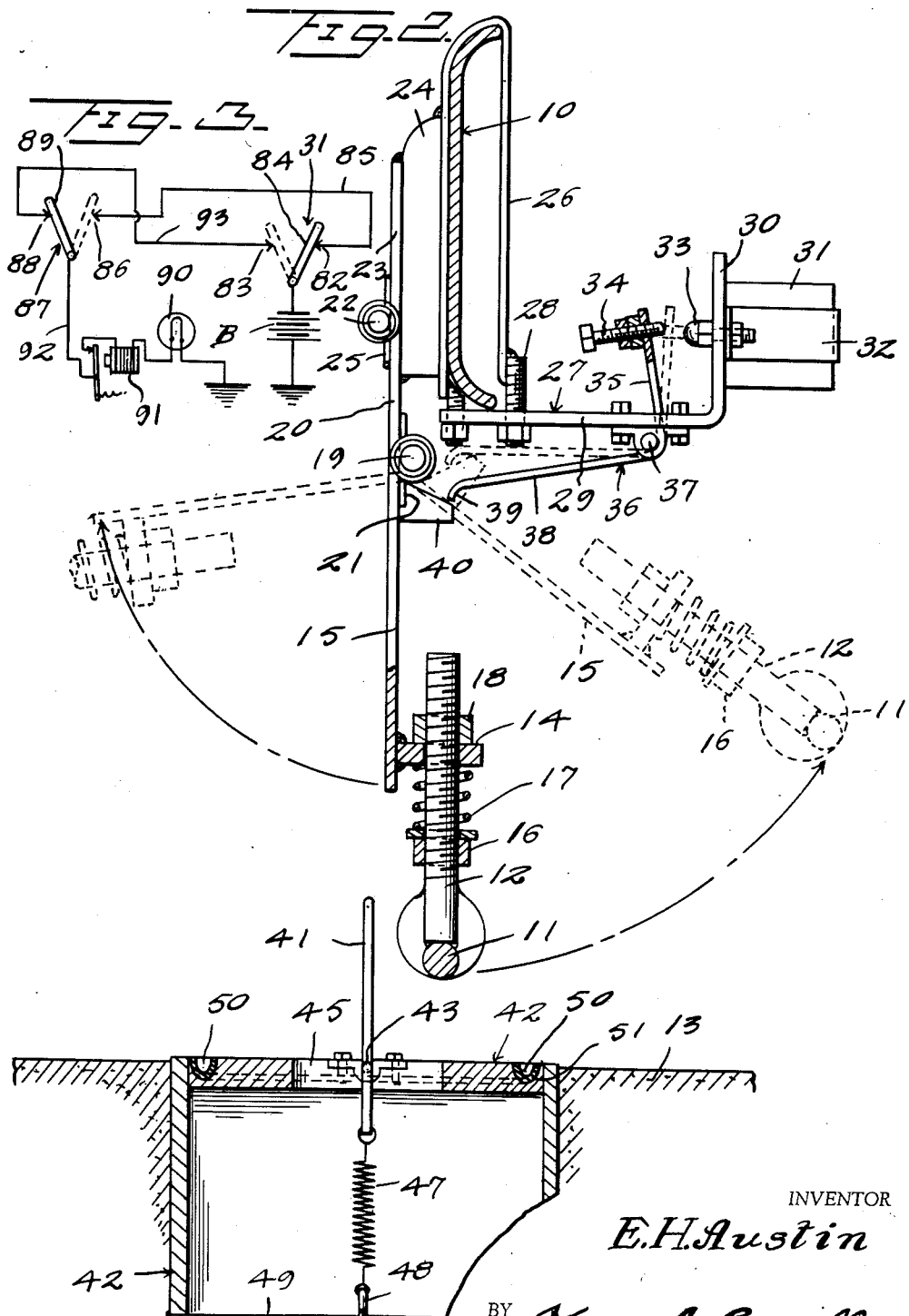
INVENTOR
*E. H. Austin*
BY
*Kimmel & Crowell*
ATTORNEYS Patented Oct. 6, 1953

2,654,876

UNITED STATES PATENT OFFICE 2,654,876

ROAD ACTUATED SAFETY SIGNAL FOR VEHICLES

Emery H. Austin, Stuart, Fla.

Application August 11, 1950, Serial No. 178,884

1 Claim. (Cl. 340—61)

This invention relates to a safety signal device for vehicles.

An object of this invention is to provide a safety signal in a motor vehicle which is designed to warn the driver of a danger point in a highway, and an improved means for automatically actuating the signal.

Another object of this invention is to provide a safety signal which is mounted in a vehicle with an improved electric circuit or circuits and circuit closer adapted to be actuated by an obstruction in the highway ahead of a danger point. In the embodiment of the invention herein disclosed a spring-pressed obstruction is mounted in the highway and a switch operator is secured to the vehicle, preferably to a bumper, in a position to contact the obstruction to thereby move the switch to a circuit closing position. The circuit includes a flasher signal with a manual switch also in the circuit so that the operation of the signal can be manually cut off and the circuit or circuits reset thereby.

With the above and other objects in view, my invention consists in the arrangement, combination and details of construction disclosed in the drawings and specification, and then more particularly pointed out in the appended claim.

In the drawings:

Figure 1 is a detailed front elevation of a safety signal constructed according to an embodiment of this invention mounted on a vehicle bumper.

Figure 2 is a sectional view taken on the line 2—2 of Figure 1.

Figure 3 is a diagrammatic view showing electric circuits embodied in this invention.

Figure 4 is a plan view of the safety tripping member.

Figure 5 is a sectional view taken on the line 5—5 of Figure 4.

Figure 6 is a vertical section partly in detail of a modified form of this invention.

Referring to the drawings, and, first, to Figures 1 to 5, inclusive, the numeral 10 designates generally a conventional bumper which is mounted on one end of a motor vehicle, preferably the front end of the vehicle.

A horizontally disposed bar 11 is disposed below the bumper 10 and at a point spaced upwardly a substantial distance from the surface of a roadway 13. The bar 11 has secured thereto a pair of upwardly extending threaded bolts 12 which are slidable through lugs 14 secured to the rear sides and the lower end portions of a pair of depending plates 15. Each bolt 12 has threaded thereon a spring tensioning nut 16, and a spring 17 is interposed between the nut 16 and the lower side of the lug 14.

A limiting nut 18 is threaded on the upper end portion of each bolt 12 and is adapted under the tension of spring 17 to bear against the upper side of lug 14. The plate 15 is hinged as indicated at 19 to the lower end of a plate 20 and is constantly urged forwardly and downwardly to a vertical operative position by means of a spring 21. The plate 20 is hingedly secured as at 22 to an upper plate 23 which is fixed to a block 24. The plate 20 is constantly urged downwardly and rearwardly to a vertical position bearing against the forward side of block 24 by means of a spring 25. The block 24 is fixed to the forward side of an inverted U-shaped clamping member 26 which engages over the bumper 10 as shown in Figure 2.

An L-shaped bracket 27 has the two bolts 28 carried by the U-shaped clamping member 26 engaging therethrough for securing the lower side 29 of bracket 27 in a horizontal and rearwardly projecting position. The bracket 27 includes a vertical and upwardly extending rear side 30 which has secured to the rear face thereof a single pole double throw switch 31. The switch 31 is secured to the rear side 30 by means of a U-shaped clamping member 32. The switch 31 includes a spring pressed button or operator 33 projecting forwardly of the vertical side 30 of bracket 27 in a position to be engaged by a switch operating member 34 in the form of a threaded bolt which is threaded through one side 35 of a bellcrank 36. The bellcrank 36 is rockably mounted on a pivot 37 carried by the horizontal side 29 of bracket 27 and is spring urged to a forward inoperative position. The bellcrank 36 includes a lower side 38 formed with a downturned forward end 39 disposed in a position to be engaged by a rearwardly projecting cam lug 40 which is fixed to the rear side of plate 15. When the bar 11 is swung rearwardly by engagement with an obstruction or tripping member as will be hereinafter described, plate 15 will swing upwardly and rearwardly so that cam lug 40 will rock the lower side 38 of bellcrank 36 upwardly and rock the upper side 35 of bellcrank 36 rearwardly so that bolt 34 will strike the switch button 33 to effect movement of the movable switch arm from one circuit closing position to another circuit closing position as will be hereinafter described. The bar 11 is adapted to strike an upwardly projecting and inverted V-shaped tripping member or obstruction 41 which is rockably carried by a box or housing 42 embedded in the roadway 13. The tripping member 41 includes a pair of laterally projecting pivot members 43 terminating in right angularly disposed arms 44 which project downwardly through openings 45 formed in the top wall 46 of housing 42.

A spring 47 is secured at one end to an arm 44 and is secured at the other end to a screw eye 48 secured to the bottom wall 49 of housing 42. The two springs 47 normally maintain the tripping member 41 in an upright and operative position. The top wall 46 of housing 42 is formed with a pair of opposed V-shaped grooves 50 which are lined with a rubber or yieldable lining 51 so that the tripping member 41 may engage within the groove 50 and be substantially flush with the top surface of the top wall 46.

Referring now to Figure 6 there is disclosed a modified form of this invention embodying a lower horizontal bar 52 similar to bar 11 which has secured thereto a pair of upwardly projecting bolts 53 slidable through lugs 54. The lugs 54 are carried by a downwardly projecting plate 55, and the bolt 54 has a spring 56 engaging thereabout which is tensioned by means of a nut 57.

A stop nut 58 is threaded on the bolt 53 and bears against the upper side of lug 54. Plate 55 is pivoted as at 59 to the lower end of an upper plate 60 and is spring pressed to a normal vertical position by means of a spring 61. The plate 60 is formed with an arcuate upper end as indicated at 62 which is hinged as indicated at 63 to the upper curved end 64 of a block 65. The block 65 is secured by fastening means 66 to the forward side of the bumper 67, and block 65 is formed at its lower end with a rearwardly projecting extension 68 to which is secured an L-shaped bracket 69. The bracket 69 includes a lower horizontal side 70 and a rear vertically disposed side 71. A switch 72 similar to switch 31 is secured by clamping means 73 to the vertical side 71 and switch 72 includes a button 74 projecting forwardly through the vertical side 71.

A bellcrank 75 is rockably secured to the bracket 69 as indicated at 76 and includes an upwardly projecting rear side 77 having a bolt 78 threaded thereto for engagement with button 74. The bellcrank 75 is spring pressed to a downward inoperative position, and the lower side 79 of bellcrank 75 is formed with a downwardly bent forward end 80 which is positioned for engagement with a cam lug 81 fixed to the upper portion of lower plate 55.

Referring now to Figure 3 there are disclosed the electric circuits within which the switches 72 and 31 are interposed. Each switch includes a pair of contacts 82 and 83 which are selectively engageable by a movable switch arm 84. The switch arm 84 is connected to one side of battery B, and contact 82 is connected by means of a conductor 85 to a contact 86 formed as part of a manually operable switch 87. The switch 87 includes a second contact 88 and a movable switch arm 89. A signal member 90 which may be a visible or audible signal is connected at one side to the ground and is connected at the other side to a flashing relay 91. The relay 91 is connected by means of a conductor 92 to switch arm 89.

Contact 83 is connected to contact 88 by means of a conductor 93. When bar 11 strikes the tripping member 41 thereby swinging plate 15 upwardly and rearwardly so that switch button 33 will be positioned inwardly by bolt 34 carried by bellcrank 36, switch arm 84 will be moved from contact 82 to the dotted position shown in Figure 3 where switch arm 84 is in engagement or circuit closing position with respect to contact 83. At this time switch 87 will have arm 89 in engagement with contact 88 so that a complete circuit will be closed through flashing relay 91 to signal member 90.

The signal member 90 will continue flashing until manual switch 87 is moved from contact 88 to contact 86. After bar 11 passes tripping member 41 spring 21 will swing plate 15 with bar 11 downwardly to the vertical reset position. When another tripping member 41 is engaged by bar 11, switch button 33 will be pressed inwardly to shift the switch arm 84 from contact 83 to contact 82. At this time manual switch arm 89 will be in engagement with contact 86 so that a complete circuit will be closed to flashing relay 91 and signal member 90. In the event bar 11 should strike tripping member 41 by reverse movement of the vehicle bar 11, the plate 15 will swing upwardly and forwardly, thereby swinging cam lug 40 away from bellcrank 36.

The structure shown in Figure 6 will operate in the same manner as that shown in Figures 1 and 2, with the exception that upper plate 60 will swing upwardly and forwardly upon rearward movement of the vehicle, and engagement with tripping member from the upper edge of bumper 67. It is contemplated that the tripping member 41 will be disposed at a point approaching a danger spot such as a curve or the like in a roadway in order that the safety signal 90 will be energized sufficiently ahead of the danger point to permit the operator of the vehicle to slow down or otherwise bring the vehicle into a safe operating position.

I claim:

A safety signal means comprising a pair of electric circuits, a signal circuit, a flashing relay interposed in said signal circuit, a signal operable by said relay a manually operable single pole double throw switch connected between said signal circuit and said pair of circuits, a second single pole double throw switch connected between said signal circuit and said pair of circuits, an operator engageable with said second switch, means mounting said operator on a vehicle in a position to engage an upwardly projecting element in a roadway, a normally vertically disposed member engageable with said operator to effect engagement of the latter, and means mounting said member in a roadway, said second switch being selectively operable to close either circuit to energize said relay in accordance with the position of said first-mentioned switch.

EMERY H. AUSTIN.

References Cited in the file of this patent

UNITED STATES PATENTS

| Number | Name | Date |
|---|---|---|
| 499,165 | Hartman et al. | June 6, 1893 |
| 1,306,857 | Salchli | June 17, 1919 |
| 1,935,838 | Efstathiou | Nov. 21, 1933 |
| 2,144,286 | Dawson | Jan. 17, 1939 |
| 2,440,587 | Krall | Apr. 27, 1948 |
| 2,444,635 | Dennis, Jr. | July 6, 1948 |
| 2,462,656 | McLendon | Feb. 22, 1949 |
| 2,526,057 | Whitley, Jr. | Oct. 17, 1950 |
| 2,567,443 | O'Meara | Sept. 11, 1951 |